United States Patent
Frerichs et al.

(10) Patent No.: US 6,865,511 B2
(45) Date of Patent: Mar. 8, 2005

(54) PROCESS AND DEVICE FOR EVALUATING THE PERFORMANCE OF A PROCESS CONTROL SYSTEM

(75) Inventors: Donald K. Frerichs, Shaker Heights, OH (US); Roman P. Chaws, Windsor Locks, CT (US)

(73) Assignee: ABB Inc., Raleigh, NC (US)

( * ) Notice: Subject to any disclaimer, the term of this patent is extended or adjusted under 35 U.S.C. 154(b) by 0 days.

(21) Appl. No.: 10/851,832

(22) Filed: May 21, 2004

(65) Prior Publication Data

US 2004/0215353 A1 Oct. 28, 2004

Related U.S. Application Data

(62) Division of application No. 10/315,856, filed on Dec. 10, 2002, now Pat. No. 6,799,143.

(51) Int. Cl.[7] .............................................. G06F 101/14
(52) U.S. Cl. ....................................... 702/182; 700/108
(58) Field of Search ............................... 702/182, 179, 702/181, 183, 188; 700/108, 38, 44, 282

(56) References Cited

U.S. PATENT DOCUMENTS

| | | | |
|---|---|---|---|
| 5,483,468 A | 1/1996 | Chen et al. | 702/186 |
| 5,838,561 A | 11/1998 | Owen | 364/152 |
| 5,949,678 A | 9/1999 | Wold et al. | 700/83 |
| 6,285,971 B1 | 9/2001 | Shah et al. | 703/2 |
| 6,298,454 B1 | 10/2001 | Schleiss et al. | 714/37 |
| 6,466,893 B1 | 10/2002 | Latwesen et al. | 702/179 |

*Primary Examiner*—Edward Raymond
(74) *Attorney, Agent, or Firm*—Woodcock Washburn LLP

(57) ABSTRACT

A preferred process for evaluating the performance of a process control system comprises generating a first set of data comprising a plurality of measurements of a first parameter controlled by the process control system and generating a second set of data comprising a plurality of measurements of a second parameter controlled by the process control system. A preferred process also comprises calculating a first statistical index from the first set of data using a statistical process control method, calculating a second statistical index from the second set of data using the statistical process control method, and combining the first and second statistical indices to produce a performance index representative of the performance of the process control system at controlling the first and second parameters.

18 Claims, 5 Drawing Sheets

PROCESS AND DEVICE FOR EVALUATING THE PERFORMANCE OF A PROCESS CONTROL SYSTEM

This application is a divisional of Ser. No. 10/315,856 filed Dec. 10, 2002 now U.S. Pat. No. 6,799,143.

FIELD OF THE INVENTION

The present invention relates to process control systems. More particularly, the invention related to a process and a device for evaluating the performance of a process-control system.

BACKGROUND OF THE INVENTION

Process control systems are commonly used to control industrial systems such as chemical reactors, distillation columns, pulp digesters, power-generation plants, etc. Innovations in control-system technology, including distributed control systems and programmable logic controllers, have increased the complexity of process control systems used in such applications. Contemporary process control systems can operate with dozens, or in some cases, hundreds of inputs and control loops.

The performance of each individual control loop of a multi-loop process control system needs to be optimized, or "tuned," to achieve optimum overall performance in the control system. The individual control loops, however, often interact with other control loops. Hence, changes in the performance of one loop (both positive and negative) can adversely affect the performance of other loops in the control system.

The performance of a multi-loop control system typically changes as both the control system and the process being controlled age. For example, pneumatic components of a control system can lose their effectiveness over time due to air leaks, and corrosion on electrical contacts and wiring can degrade the effectiveness of electronic components. Moreover, the above-noted interaction between control loops in a multi-loop system can multiply the adverse effects associated with the degradation of a single control loop.

Performance degradation in a process control system can adversely affect the process being controlled by the system. Hence, the performance of process control systems is often monitored to determine when corrective action such as maintenance, repair, or retuning is needed.

Most current techniques for monitoring the performance of multi-loop process control systems analyze each controlled parameter on an individual basis. In other words, each control loop is usually considered in isolation from the other loops, and a single representation of the overall performance of the system typically is not available. Hence, it can be difficult to monitor the overall performance of the process control system, and to compare the overall performance with a benchmark level to determine when corrective action such as maintenance or repairs is required. Furthermore, typical monitoring techniques do not account for the effects of different operating conditions on the performance of the individual control loops, or for the relative importance of certain loops with respect to factors such as economic impact.

SUMMARY OF THE INVENTION

A preferred process for evaluating the performance of a process control system at controlling a first and a second process operating parameter of an automated system comprises generating a first set of data comprising a plurality of measurements of the first process operating parameter, generating a second set of data comprising a plurality of measurements of the second process operating parameter, and calculating a first statistical index from the plurality of measurements of the first process operating parameter using a statistical process control method.

A preferred process also comprises calculating a second statistical index from the plurality of measurements of the second process operating parameter using the statistical process control method, scaling the first and second statistical indices based on predetermined characteristics of the first and second process operating parameters, and combining the first and second statistical indices to produce a performance index representative of the performance of the process control system at controlling the first and second process operating parameters.

A preferred process for evaluating the performance of a system comprises sampling data representative of a first and a second parameter controlled by the system, calculating a first and a second statistical index for the respective first and second parameters, scaling the first and second statistical indices based on predetermined characteristics of the first and second parameters, and combining the first and second statistical indices.

A preferred process for evaluating the performance of a process control system comprises generating a first set of data comprising a plurality of measurements of a first parameter controlled by the process control system and generating a second set of data comprising a plurality of measurements of a second parameter controlled by the process control system.

A preferred process also comprises calculating a first statistical index from the first set of data using a statistical process control method, calculating a second statistical index from the second set of data using the statistical process control method, and combining the first and second statistical indices to produce a performance index representative of the performance of the process control system at controlling the first and second parameters.

A preferred process for evaluating the performance of a process control system at controlling a first and a second process operating parameter comprises calculating a first statistical index for the first process operating parameter based on a plurality of measurements of the first process operating parameter, calculating a second statistical index for the second process operating parameter based on a plurality of measurements of the second process operating parameter, scaling the first and second statistical indices based on predetermined characteristics of the first and second process operating parameters, and combining the first and second statistical indices.

Another preferred process for evaluating the performance of a process control system at controlling a first and a second process operating parameter comprises calculating a first statistical index for the first process operating parameter based on a plurality of measurements of the first process operating parameter, calculating a second statistical index for the second process operating parameter based on a plurality of measurements of the second process operating parameter, scaling the first and second statistical indices based on predetermined characteristics of the first and second process operating parameters, and calculating a performance index representative of the performance of the process control system at controlling the first and second process operating parameters based on the scaled first and second statistical indices.

A preferred embodiment of a device for evaluating the performance of a process control system at controlling a first and a second process operating parameter of an automated system comprises an input/output interface for communicating with the process control system, and a central processing unit electrically coupled to the input/output interface. The central processing unit comprises a processor electrically coupled to the input/output interface, a memory-storage device electrically coupled to the processor, and a power supply electrically coupled to the processor and the memory-storage device.

The central processing unit also comprises a set of computer-executable instructions stored on the memory-storage device for generating a first set of data comprising a plurality of measurements of the first process operating parameter, generating a second set of data comprising a plurality of measurements of the second process operating parameter, calculating a first statistical index from the plurality of measurements of the first process operating parameter using a statistical process control method, calculating a second statistical index from the plurality of measurements of the second process operating parameter using the statistical process control method, scaling the first and second statistical indices based on predetermined characteristics of the first and second process operating parameters, and combining the first and second statistical indices to produce a performance index representative of the performance of the process control system at controlling the first and second process operating parameters.

A preferred embodiment of a device for evaluating the performance of a system comprises an input/output interface for communicating with the system, and a central processing unit electrically coupled to the input/output interface. The central processing unit comprises a processor electrically coupled to the input/output interface, a memory-storage device electrically coupled to the processor, and a power supply electrically coupled to the processor and the memory-storage device.

The central processing unit also comprises a set of computer-executable instructions stored on the memory-storage device for sampling data representative of a first and a second parameter controlled by the system, calculating a first and a second statistical index for the respective first and second parameters, scaling the first and second statistical indices based on predetermined characteristics of the first and second parameters, and combining the first and second statistical indices.

A preferred embodiment of a power-generation system comprises a generator for generating electricity, a boiler for heating a working fluid, and a turbine in fluid communication with the boiler for expanding the working fluid, the turbine being mechanically coupled to the generator and driving the generator. A preferred embodiment of a power-generation system also comprises a condenser in fluid communication with turbine for condensing the working fluid, a pump in fluid communication with the condenser and the boiler for pressurizing the working fluid, a process control system for controlling a first and a second process operating parameter of the power-generation system, and a device for evaluating the performance of the process control system.

The preferred embodiment of the device comprises an input/output interface for communicating with the process control system, and a central processing unit electrically coupled to the input/output interface. The central processing unit comprises a processor electrically coupled to the input/output interface, a memory-storage device electrically coupled to the processor, and a power supply electrically coupled to the processor and the memory-storage device.

The central processing unit also comprises a set of computer-executable instructions stored on the memory-storage device for sampling data representative of the first and second process operating parameters, calculating a first and a second statistical index for the respective first and second process operating parameters, scaling the first and second statistical indices based on predetermined characteristics of the first and second process operating parameters, and combining the first and second statistical indices.

BRIEF DESCRIPTION OF THE DRAWINGS

The foregoing summary, as well as the following detailed description of a presently-preferred embodiment, is better understood when read in conjunction with the appended drawings. For the purpose of illustrating the invention, the drawings show an embodiment that is presently preferred. The invention is not limited, however, to the specific instrumentalities disclosed in the drawings. In the drawings.

DESCRIPTION OF PRESENTLY-PREFERRED EMBODIMENTS

Figure 1:
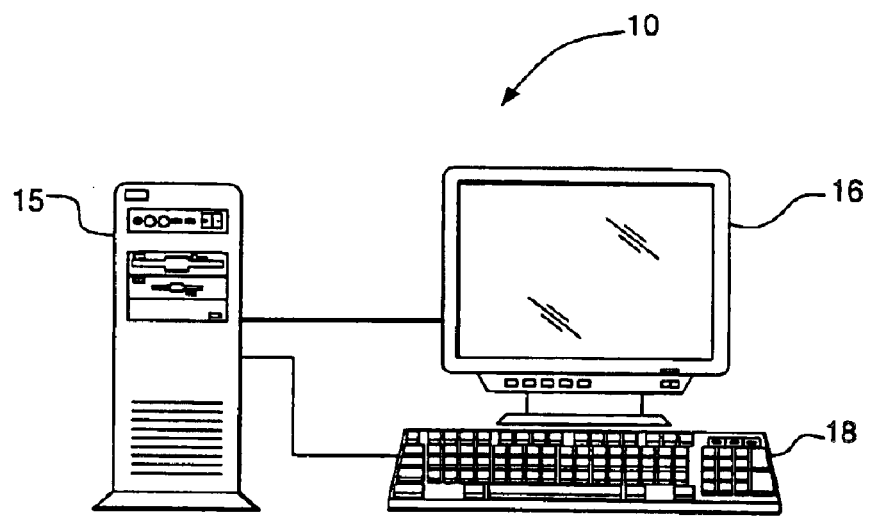
FIG. 1 is a diagrammatic illustration of a preferred embodiment of a device for monitoring the performance of a process control system.
Figure 2:
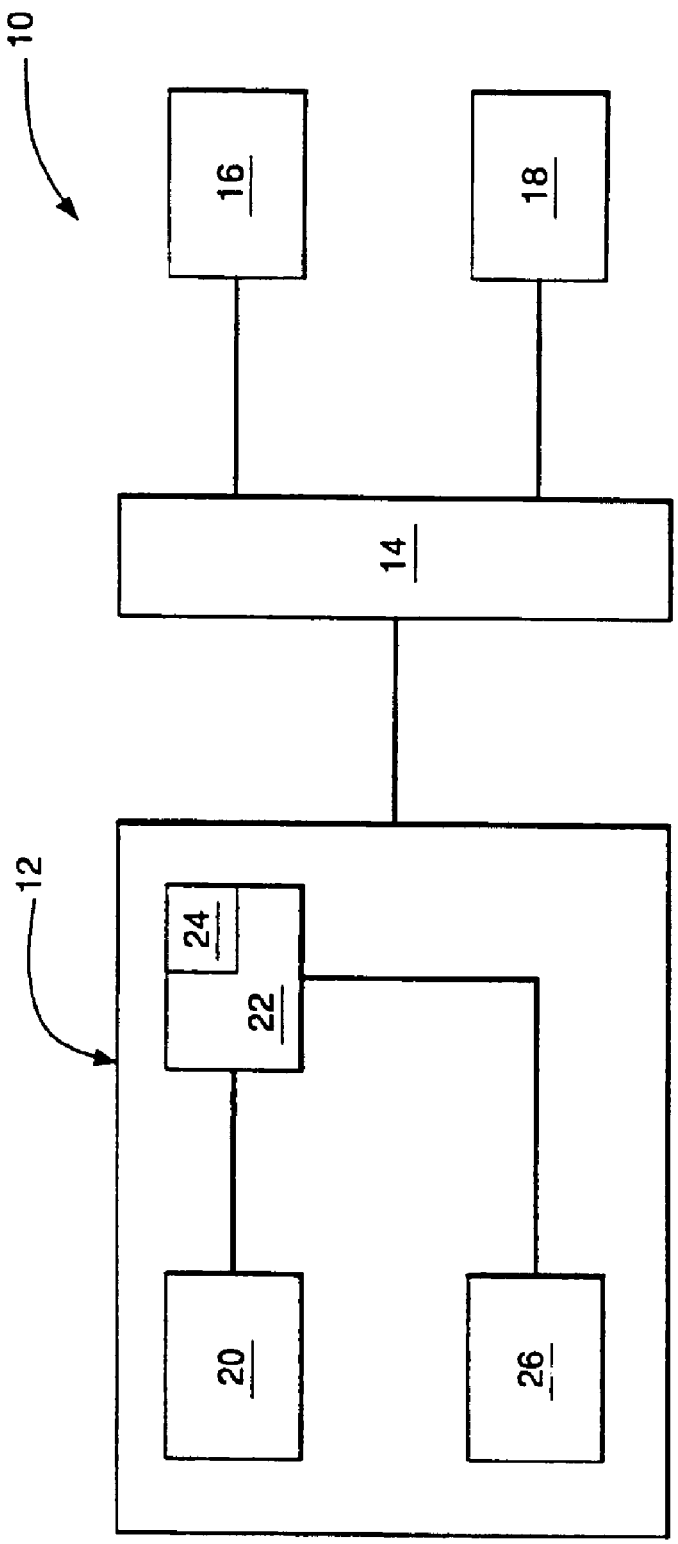
FIG. 2 is a block diagram of the device shown in FIG. 1.
Figure 3:
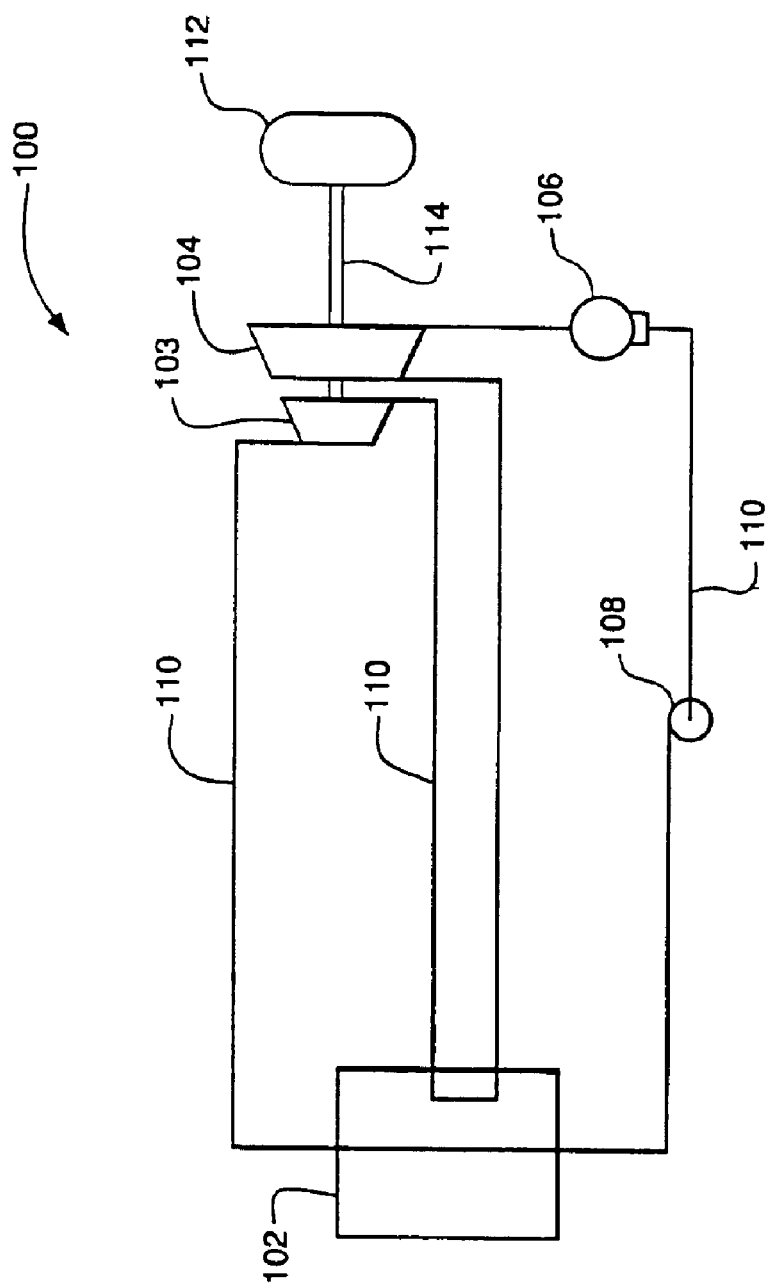
FIG. 3 is a diagrammatic illustration of a power-generation system having a process-control system the performance of which can be monitored by the device shown in FIG. 1.

A presently-preferred embodiment of a device 10 for evaluating the performance of a control system is depicted in FIGS. 1 and 2. The device 10 is described herein in connection with a conventional coal-fired power-generation system 100 as shown in FIG. 3. This particular type of continuous-process system is described for exemplary purposes only, as the invention can be applied to other types of continuous-process systems such as chemical reactors, distillation columns, pulp digesters, etc.

The power-generation system 100 comprises a boiler 102 configured for operation with two types of coal, e.g., powder river basin and eastern bituminous coals. The power-generation system 100 further comprises a high-pressure turbine 103, a low-pressure turbine 104, a condenser 106, and a feed-water pump 108. The boiler 102, high and low-pressure turbines 103, 104, condenser 106, and feed-water pump 108 are coupled by piping 110. The high and low-pressure turbines 103, 104 are mechanically coupled to a generator 112.

The power-generation system 100 operates as a continuous-process system, based on a conventional reheat cycle. Pressurized water is heated in the boiler 102 to produce superheated steam. The steam is directed to the high-pressure turbine 103 via the piping 110. The steam is expanded in the high-pressure turbine 103, thereby imparting rotational motion to a rotor thereof. The resulting torque produced by the high-pressure turbine 103 is transferred to the generator 112 by a shaft 114. The torque drives the generator 112 and thereby causes the generator 112 to produce electricity.

The steam exits the high-pressure turbine 103 and is directed to the boiler 102 via the piping 110. The steam is reheated in the boiler 102, and is subsequently directed to the low-pressure turbine 104. The steam is further expanded in the low-pressure turbine 104, thereby imparting rotational motion to a rotor thereof. The resulting torque produced by the low-pressure turbine 104 is transferred to the generator 112 by the shaft 114, further driving the generator 112.

The steam (and any condensate) from the low-pressure turbine 104 are directed to the condenser 106 via the piping 110. The condensate exiting the condenser 106 is directed to the feed-water pump 108, which pumps the condensate under pressure to the boiler 102.

Figure 4:
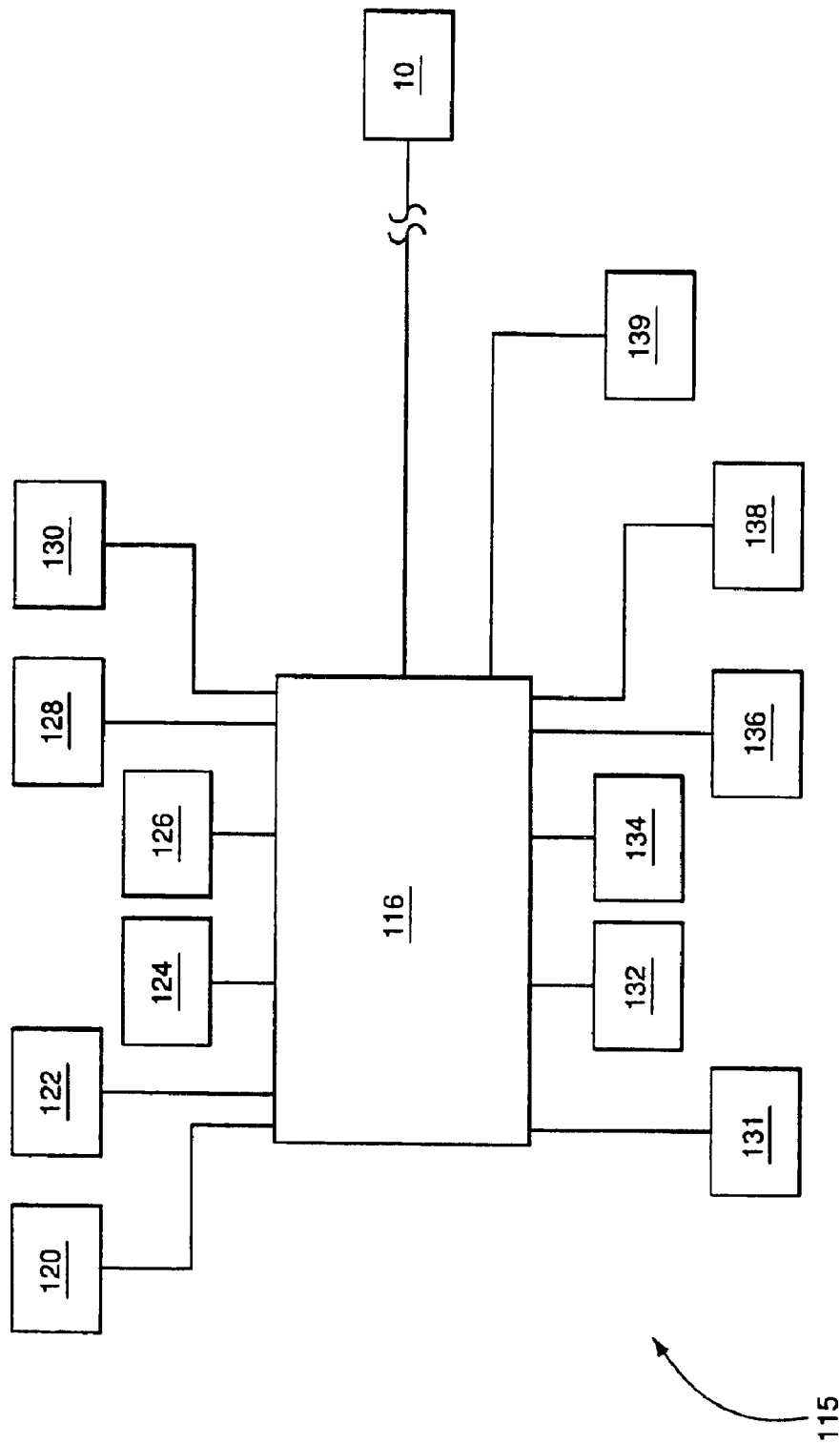
FIG. 4 is a block diagram showing a process control system of the power-generation system shown in FIG. 3.

The power-generation system 100 further comprises a process control system 115 that controls the operation thereof (see FIG. 4).

The process control system 115 comprises a control unit 116. The control unit 116 comprises a plurality of individual controllers that each control a respective key process operating parameter of the power-generation system 100 on an automatic, closed-loop basis. For example, the control unit 116 effectuates closed-loop control of the following parameters: main steam temperature ("MST"); main steam pressure ("MSP"); temperature of the reheated steam ("RHT"); power output of the power-generation system 100 ("MW"); drum level in the boiler 102 ("DL"); and oxygen level in the exhaust of the boiler 102 ("$O_2$") (these parameters are hereinafter referred to as "the process operating parameters" of the power-generation system 100). It should be noted that these particular parameters are listed for exemplary purposes only; the numerous other parameters controlled by the control unit 116 are not discussed herein, for brevity.

The control unit 116 can be any type of device suitable for controlling multiple parameters of a continuous process on an automatic, closed-loop basis. For example, the control unit 116 can be a programmable logic controller of conventional design.

The process control system 115 also comprises a first and a second temperature sensor 120, 122, a pressure transducer 124, an electrical power sensor 126, a level transducer 128, and an oxygen sensor 130 (see FIG. 4). The temperature sensors 120, 122, pressure transducer 124, electrical power sensor 126, level transducer 128, and oxygen sensor 130 are electrically coupled to the control unit 116, and provide the control unit 116 with the following inputs.

The temperature sensor 120 and the pressure transducer 124 are located proximate the inlet of the high pressure turbine 103, and are used to measure MST and MSP, respectively. The temperature sensor 122 measures RHT, and is located proximate the inlet of the low-pressure turbine 104. MW is measured using the electrical power sensor 126. DL is measured by the level transducer 128, which is located in the drum of the boiler 102. The oxygen sensor 130 is located in the exhaust stack of the boiler 102, and measures the amount of oxygen in the exhaust of the boiler 102.

The process control system 115 further comprises a throttling valve 131, water sprays 132, 134, a fuel regulator 136, fans 138, and a feed-water valve 139 (see FIG. 4). The throttling valve 131, water sprays 132, 134, fuel regulator 136, fans 138, and feed-water valve 139 are electrically coupled to the process control unit 116 and, in conjunction with the process control unit 116, effectuate control of the power-generation system as follows.

The water sprays 132, 134, which are located in the piping 110, provide primary control of MST and RHT. MSP and MW are controlled primarily by varying the flow rate of the steam using the throttling valve 131, which is located directly upstream of the high-pressure turbine 103. Primary control of MSP and MW is also effectuated by varying the fuel input to the boiler 102 using a fuel regulator 136.

DL is controlled primarily by regulating the flow of water to the drum of the boiler 102 using the feed-water valve 139. $O_2$ is controlled primarily by varying the amount of oxygen present in the combustion zone of the boiler 102 using the fans 138, which force air into the combustion zone. (In actual operation, each of the noted parameters is influenced by the others. Hence, control of the noted parameters is, to some extent, interdependent.)

Further details relating to the operation of the power-generation system 100 are not necessary to an understanding of the invention, and therefore are not presented herein.

Details of the device 10 are as follows. The device 10 can be, for example, a personal computer (see FIGS. 1 and 2). It should be noted that this particular embodiment is described for exemplary purposes only. The present invention can be embodied as any type of suitable computing platform such as a programmable logic controller, a minicomputer, a mainframe computer, etc.

The device 10 comprises a central processing unit 12, an input/output ("I/O") interface 14 electrically coupled to the central processing unit 12, and a casing 15 that houses the central processing unit 12 and the I/O interface 14. The device 10 can also comprise a display screen 16 and a keypad 18 each electrically coupled to the I/O interface 14.

The device 10 is communicatively coupled to the control unit 116 of the process control system 115 via, for example, an Ethernet connection. The device 10 and the control unit 116 can be communicatively coupled by other suitable means such as the internet, an intranet, a radio communication link, etc.

The central processing unit 12 comprises a processor 20, a memory-storage device 22 electrically coupled to the processor 20, a set of computer-executable instructions 24 stored on the memory-storage device 22, and a power supply 26 electrically coupled to the processor 20 and the memory-storage device 22.

The device 10 provides a measure of the overall performance of the process control system 115. More specifically, the device 10 uses statistical process control methods to generate statistical indices for each process operating parameter. Each index provides an indication of the performance of the process control system 115 in controlling the corresponding process operating parameter. The indices for the various process operating parameters are scaled, and then combined into a single index indicative of the overall performance of the process control system 115. Specific details of this process are as follows.

Figure 5:
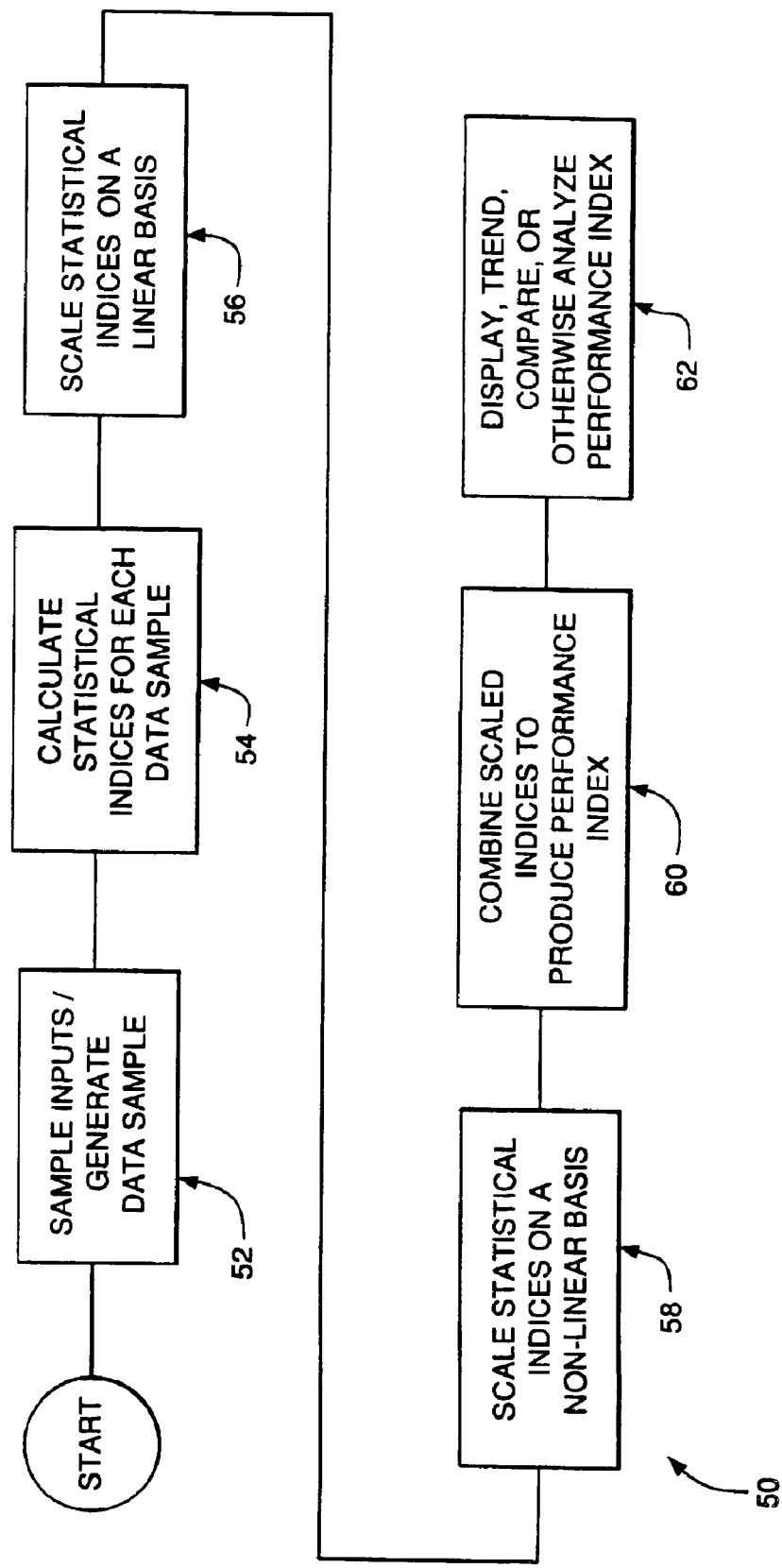
FIG. 5 is a flow diagram of a preferred process for evaluating the performance of a process control system such as the process control system shown in FIG. 4.

A preferred process 50 for evaluating the overall performance of the process-control system 115 is depicted in the form of a flow diagram in FIG. 5. The device 10 receives inputs from the process control unit 116 on a substantially continuous basis. These inputs correspond to MST, MSP, RHT, MW, DL, and $O_2$, as discussed previously (these particular process operating parameters, as explained above, represent a subset of the process operating parameters for the power-generation system 100; the remaining process operating parameters are not discussed herein, for brevity.) The device 10 also receives inputs corresponding to the operating condition, i.e., the fuel type, power output, and operating state, of the power-generation system 100.

The device 10, in accordance with commands generated by the computer-executable instructions 24, samples each input and generates a data sample for the corresponding process operating parameter (activity 52 in FIG. 5). Each data sample comprises six individual data points acquired at intervals of approximately ten seconds, i.e., each six-point data sample is acquired over approximately one minute. Moreover, the sampling occurs on a substantially simultaneous basis for all of the process operating parameters. It should be noted that a particular sample size, sampling interval, and overall sampling time are specified herein for exemplary purposes only. Other combinations of sample size, sampling interval, and overall sampling time can be used in the alternative.

The device 10, in accordance with commands generated by the computer-executable instructions 24, generates indices for each data sample using statistical process control methods. The device 10 uses the Shewhart statistical process control method, commonly known among those skilled in the field of statistical process control, to calculate two statistical indices for each data sample (activity 54). The two statistical indices correspond to the range and the arithmetic mean of the data sample. The range for each data sample is calculated as the difference between the highest and lowest of the six inputs in the data sample. The arithmetic mean (commonly referred to as "X bar") is calculated by adding all of the inputs in the data sample, and dividing the sum by six (the number of inputs).

It should be noted that the use of the Shewhart statistical process control method is disclosed for exemplary purpose only. Other statistical process control methods that generate other types of statistical indices, e.g., Cusum or EWMA, can be used in the alternative.

Each statistical index is subsequently scaled on a linear basis by the device 10, in accordance with commands generated by the computer-executable instructions 24 (activity 56). The linear scaling normalizes each statistical index based on its magnitude and economic impact in relation to the other statistical indices calculated by the device 10.

For example, the statistical index corresponding to the arithmetic mean of MST is relatively large (typically in the range of approximately −20 to +20), and has a relatively high impact on the operating cost of the power-generation system 100. This particular index is thus scaled downward to account for its high magnitude, and upward to account for it high economic impact. (In actual operation, a single linear scaling factor reflecting both magnitude and economic impact is stored in the memory-storage device 22, and applied to the corresponding statistical index.)

The statistical index corresponding to the arithmetic mean of DL, on the other hand, is relatively small (typically in the range of approximately −1 to +1), and has a relatively low impact on the operating cost of the power-generation system 100. This particular index is thus scaled upward to account for its low magnitude, and downward to account for its low economic impact.

It should be noted that the linear-scaling factors are application-dependent, and the choice of appropriate values involves an exercise of judgment. Moreover, an understanding of the process being controlled, and the site-specific instrumentation data characteristics is necessary to estimate appropriate values. Hence, specific values for the linear-scaling factors are not set forth herein.

Each linearly-scaled statistical index can subsequently undergo additional scaling. More specifically, the device 10, in accordance with commands generated by the computer-executable instructions 24, further scales each linearly-scaled index by squaring the index (activity 58). This non-linear scaling emphasizes indices that, after the linear-scaling process, have a relatively high magnitude (and therefore, high statistical significance). The non-linear scaling de-emphasizes indices that, after the linear-scaling process, have a relatively low magnitude (and low statistical significance).

It should be noted that the use of squaring to scale the statistical indices on a non-linear basis is disclosed for exemplary purposes only. Other non-linear scaling techniques, such as cubing or non-linear equations, can be used in the alternative. Moreover, the non-linear scaling process can be entirely forgone in alternative embodiments.

The statistical indices are combined after being scaled on a linear and non-linear basis. In particular, the device 10, in accordance with commands generated by the computer-executable instructions 24, combines all of the scaled indices into a single value using a square-root sum-of-squares technique (activity 60). This value, referred to hereinafter as the "performance index" of the process control system 115, is a numerical indication representing the performance of the process control system 115 in controlling MST, MSP, RHT, MW, DL, and $O_2$.

It should be noted that the use of a square-root sum-of-squares technique to combine the statistical indices is disclosed for exemplary purposes only. Other numerical techniques such as linear averaging, moving averaging, or exponentially-weighted moving averaging can be used in the alternative.

The process 50 can be repeated as soon as an overall performance index has been calculated for a particular set of acquired data. In other words, another set of data can be acquired, and another performance index can be generated immediately upon completion of processing of the previously-acquired data. Hence, the overall performance index can be generated on a real-time basis. Alternatively, the process 50 can be repeated after a predetermined period has elapsed.

Representing the overall performance of the process control system 115 as a single value, i.e., the performance index, can provide substantial advantages. For example, the performance index can easily be monitored and compared a predetermined baseline value for the corresponding operating condition (activity 62). Deviations from the baseline value greater than a predetermined amount can be interpreted as an indication that the process control system 115 requires some type of maintenance, overhaul, or repair.

The performance index can be displayed on the display screen 16 of the device 10, or in other locations such as the control room of the power-generation system 100, as a real-time indication of the performance of the process-control system 1 15 (activity 62). Moreover, an alarm can be used to alert the system operators when the performance index rises above a predetermined value. The performance index can also be transmitted to a centralized control center or data base of the utility company that operates the power-generation system 100.

The performance index, as a single value, readily lends itself to data trending. Such trending can alert the system operators to impending or incipient maintenance issues. The computer-executable instructions 24 of the device 10 can be programmed to generate trending data. Alternatively, the performance index can be transmitted to another computing device, such as a centralized mainframe computer of the utility company, for trending.

Each performance index, as discussed above, corresponds to a particular operating condition, i.e., to a particular combination of fuel, power output, and operating state, for the power-generation system 100. The device 10 stores stored each performance index in the memory-storage device, along with data indicating the operating condition corresponding to that performance index. Hence, performance indices acquired under the same operating condition can readily be compared and trended. Classifying the performance indices according to operating condition substantially improves the quality of the performance analysis available through the device 10 and the process 50. In particular, comparing performance indices acquired under the same operating condition substantially eliminates variations between the performance indices caused by differences in the fuel power output, or operating state of the power-generation system 100.

Weighting the individual statistical indices by scaling can also improve the quality of the performance analysis available through the device 10 and the process 50. Scaling, as discussed above, can be used to emphasize (or de-emphasize) statistical indices of relatively high (or low) significance so the performance index better reflects meaningful degradations in the performance of the process control system 115.

Moreover, the device 10 (or another suitable computing platform) can be programmed to sort and trend the performance indices by fuel type, power output, operating state, or various combinations of these factors. For example, the device 10 can be programmed to group and trend performance indices corresponding to high-power operation, or performance indices corresponding to high-power operation with a particular type of fuel. The individual statistical indices for each process operating parameter, i.e., range and arithmetic mean, can also be displayed or trended to assist in identifying specific control loops that require maintenance or repair. In fact, the device 10 can be programmed to combine, scale, or otherwise manipulate the statistical indices in virtually any manner so that specific or general patterns in the process operating parameters controlled by each loop can be monitored or identified.

It is to be understood that even though numerous characteristics and advantages of the present invention have been set forth in the foregoing description, the disclosure is illustrative only and changes may be made in detail within the principles of the invention to the full extent indicated by the broad general meaning of the terms in which the appended claims are expressed. For example, the device 10 and the process 50 can be adapted to monitor virtually any type of continuous or non-continuous industrial process, such as a production process where multiple dimensions of a finished product must each remain within a predetermined range.

What is claimed is:

1. A process for evaluating the performance of a system, comprising:
   sampling data representative of a first and a second parameter controlled by the system;
   calculating a first and a second statistical index for the respective first and second parameters;
   scaling the first and second statistical indices based on predetermined characteristics of the first and second parameters; and
   combining the first and second statistical indices.

2. The process of claim 1, wherein scaling the first and second statistical indices based on predetermined characteristics of the first and second parameters comprises scaling the first and second statistical indices on a linear basis.

3. The process of claim 1, wherein scaling the first and second statistical indices based on predetermined characteristics of the first and second parameters comprises scaling the first and second statistical indices based on a relative economic impact of the first and second parameters.

4. The process of claim 1, wherein scaling the first and second statistical indices based on predetermined characteristics of the first and second parameters comprises scaling the first and second statistical indices based on a relative magnitude of the first and second parameters.

5. The process of claim 1, wherein scaling the first and second statistical indices based on predetermined characteristics of the first and second parameters comprises scaling the first and second statistical indices on a non-linear basis.

6. The process of claim 5, wherein scaling the first and second statistical indices on a non-linear basis comprises squaring each of the first and second indices.

7. The process of claim 1, wherein calculating a first and a second statistical index for the respective first and second parameters comprises calculating the first and second statistical indices using a statistical process control method.

8. The process of claim 7, wherein the statistical process control method is a Shewhart statistical process control method.

9. The process of claim 7, wherein calculating the first and second statistical indices using a statistical process control method comprises calculating a range and an arithmetic mean of a first sample of the data representative of the first process operating parameter and a second sample of the data representative of the second process operating parameter.

10. The process of claim 1, wherein combining the first and second statistical indices comprises combining the first and second statistical indices using a square-root sum-of-squares technique.

11. The process of claim 1, wherein sampling data representative of a first and a second parameter controlled by the system comprises sampling the data representative of the first parameter a predetermined number of times over a predetermined interval and simultaneously sampling the data representative of the second parameter the predetermined number of times over the predetermined interval.

12. The process of claim 11, wherein the predetermined number of times is six and the predetermined interval is approximately ten seconds.

13. The process of claim 1, further comprising sampling and storing data representative of an operating condition of an automated system controlled by the system.

14. A device for evaluating the performance of a system, comprising an input/output interface for communicating with the system, and a central processing unit electrically coupled to the input/output interface and comprising a processor electrically coupled to the input/output interface, a memory-storage device electrically coupled to the processor, a power supply electrically coupled to the processor and the memory-storage device, and a set of computer-executable instructions stored on the memory-storage device for:
   sampling data representative of a first and a second parameter controlled by the system;
   calculating a first and a second statistical index for the respective first and second parameters;
   scaling the first and second statistical indices based on predetermined characteristics of the first and second parameters; and
   combining the first and second statistical indices.

15. The device of claim 14, further comprising a display screen and a keypad electrically coupled to the input/output interface.

16. The device of claim 14, further comprising a casing for housing the central processing unit and the input/output interface.

17. The device of claim 14, wherein the input/output interface is communicatively coupled to the process control system by an Ethernet connection.

18. The device of claim 14, wherein calculating a first and a second statistical indices for the respective first and second parameters comprises calculating a range and an arithmetic mean of a first sample of the data representative of the first process operating parameter and a second sample of the data representative of the second process operating parameter.

* * * * *